United States Patent [19]

Bedi

[11] Patent Number: 4,884,660

[45] Date of Patent: Dec. 5, 1989

[54] PROCESS FOR SIMPLE AND HIGH SPEED OIL CHANGE AND CRANK CASE FLUSHING IN AN INTERNAL COMBUSTION ENGINE

[75] Inventor: Ram Bedi, Birmingham, Mich.

[73] Assignee: K.J. Manufacturing, Wixom, Mich.

[21] Appl. No.: 350,303

[22] Filed: May 11, 1989

[51] Int. Cl.[4] .................. F16C 3/14

[52] U.S. Cl. .................. 184/1.5; 134/169 A

[58] Field of Search .................. 184/1.5; 134/169 A

[56] References Cited

U.S. PATENT DOCUMENTS

| | | | |
|---|---|---|---|
| 2,249,303 | 7/1941 | Smith | 184/1.5 |
| 2,554,389 | 5/1951 | Stevens | 184/1.5 |
| 2,594,779 | 4/1952 | Huffman | 184/1.5 |

*Primary Examiner*—Carroll B. Dority

*Attorney, Agent, or Firm*—Basile and Hanlon

[57] ABSTRACT

A process for high speed oil change in an internal combustion engine having a crank case with moveable parts and with oil pans modified to include a through bore and an appropriate associated coupling member. The oil change process includes the following steps: attaching an oil change conduit to the coupling member, the oil change conduit having at least one fill hose with a fill-spray section and at least one suction hose which extend into the oil pan; spraying a flushing fluid under pressure through the fill spray assembly and the fill hose into the oil pan such that the solvent contacts the movable engine parts and the interior surfaces of the oil pan; removing the spent oil through the suction hose; introducing the flushing fluid into the oil pan through the fill-spray assembly located in the oil pan; removing the introduced flushing fluid through the suction hose; introducing fresh motor oil into the oil pan through the fill-spray assembly after removal of the flushing fluid; and removing the oil change conduit from the coupling member. The flushing fluid employed is composed of high flash point kerosene with additives to enhance detergency and lubricity.

8 Claims, 1 Drawing Sheet

PROCESS FOR SIMPLE AND HIGH SPEED OIL CHANGE AND CRANK CASE FLUSHING IN AN INTERNAL COMBUSTION ENGINE

BACKGROUND OF THE INVENTION

1. Field of the Invention

This invention relates to methods or processes for changing motor oil and flushing the motor oil reservoir or container in a vehicle having an oil pan or similar oil reservoir. Such reservoirs can be found in automobiles, trucks, tractors, heavy earth moving equipment, military equipment, or the like. More particularly, this invention relates to processes in which spent or dirty oil is expediently removed from the oil pan which is, then, flushed and finally refilled with fresh motor oil in an integrated self-contained process.

2. Background of the Relevant Art

The benefits of routine oil changes in a vehicle are well known. Routine oil changes have been shown to increase engine life and performance. With repeated prolonged use, motor oil builds up suspended particles, metallic and non-metallic, from the abrasive and or adhesive wear of engine parts against one another and from products of incomplete combustion and improper air intake. The particles, in turn, cause abrasive wear of the engine bearings, piston rings and other moving parts and the reduction of the motor oil lubricity as various additives and lubricating components become depleted. This adversely effects engine performance and, if left unchanged, can destroy or cripple the engine performance.

It is recommended by at least one oil manufacturer that the level of total solid concentration be limited to levels below 3.0% with levels of silica being present in amounts lower than 25 ppm and sodium in amounts lower than 200 ppm.

To obtain satisfactory automotive engine performance, and maintain solid concentration levels in the motor oil lower than the recommended 3.0%, changing the motor oil in an automobile engine is a necessary, but an undesirable, dirty, and time-consuming task. As vehicles are designed, the oil pan serves the purpose of a reservoir for circulation of engine oil. To remove the contaminated oil, the drain plug, located in the lowermost region of the oil pan, is opened. The spent oil containing suspended particles is permitted to flow under gravity out of the pan into a suitable receptacle. After the spent oil is removed, the plug is replaced and fresh oil is added to the engine; usually through a separate opening in the engine valve cover. This process of gravity drainage does not remove all of the spent oil with its metallic and non-metallic particles which stick to the oil pan container walls, as well as engine components such as the crank shaft, connecting rods, pistons and the like which are exposed to the motor oil spray lubrication. These particles remain to be mixed with fresh motor oil. Thus the concentration of contaminants is lowered by dilution but only a part of the total contaminants are eliminated.

The oil change process is essentially the same whether performed at home, at service stations or at one of the various so called rapid oil change centers which have opened in recent years. They advertize themselves as quick oil change or ten-minute oil change centers. These so called "Rapid Oil Change" centers are faster than other automotive service centers simply because they focus their total service business on oil changes only and are more efficient. The rate of oil drainage and oil fill rates are the same as those of service stations because of the constant drainage and filling force limited by gravity. Thus, while in stations and rapid oil change centers, the process can be simplified with the use of hydraulic racks, special oil collection receptacles and the like, the basic procedure of drainage through a restricted drain opening and oil replacement through a separate opening is standard and as is gravity.

This basic procedure has several drawbacks. It is time-consuming. The speed with which the oil drains through the drain valve is limited by the restrictive opening and gravity. In commercial settings, this can detain personnel and valuable, expensive resources such as hydraulic racks while waiting for the oil to drain. As previously indicated, the oil pan never drains completely. Oil containing suspended and sticky particles adheres to the walls of the pan to be mixed with the new oil added. This reduces the life of the oil filter which further reduce the life of the engine itself over extended use for a period of years.

The basic process is also messy. The drained oil must be moved, handled and, ultimately, disposed of in an appropriate manner. Drainage into open containers increases the opportunities for spillage and mishandling and exposure. Fresh oil introduced into the opening in the engine valve cover can be accidentally spilled in the engine compartment. The spilled oil can smoke and burn if spilled on the manifold and can attract dirt and grime, regardless.

Thus, it would be desirable to provide a process which accelarates removal of spent oil more completely from the crank case. It is also desirable to provide a process which permits the removal of adhering contaminants, degraded additives and oil products and replacement with fresh engine oil in an essentially clean container through a unified process at one single location in the associated vehicle. It is also desirable to provide a system which reduces the amount of spent oil handling as required in the conventional oil change service station. Finally, it is desirable to provide a process which could be easily employed by the vehicle owner with all the benefits of the method of the present invention such as time saving, convenience, cleaner containers or oil pans and minimum or no exposure to the motor oil and, finally, longer lasting engines.

SUMMARY OF THE INVENTION

The present invention is a process for high speed engine oil change in an internal combustion engine having a crank case and an oil pan which is equipped with a suitable through bore and associated coupling member. The process includes the following steps:

attaching an oil change conduit to the coupling, the oil change conduit having at least one suction hose and at least one fill hose, the suction hose and fill hose having extension which project into the interior of the oil pan;

spraying a flushing fluid under pressure through the fill hose into the oil pan such that the flushing fluid contacts the moveable engine parts and the interior surfaces of the oil pan;

removing spent oil and sprayed flushing fluid from the oil pan through the suction hose;

introducing additional flushing fluid into the oil pan under pressure through the fill hose through the extension on the fill hose to remove residual adhering particles remaining;

removing the introduced flushing fluid from the oil pan through the suction hose;

after the introduced flushing fluid and dirty oil are removed, filling the essentially clean oil pan with fresh motor oil through the extension of the fill hose; and removing the oil change conduit from the coupling member.

BRIEF DESCRIPTION OF THE DRAWING

In the present description, reference is made to the following drawing in which.

DESCRIPTION OF THE PREFERRED EMBODIMENT

The process of the present invention can be employed successfully in vehicles having oil pans modified to include a suitable coupling and through bore extending into the interior of the oil pan. The through bore may be located at any suitable location in the oil pan. It is also within the purview of this invention to employ the drain plug as a suitable through bore.

Figure 1:
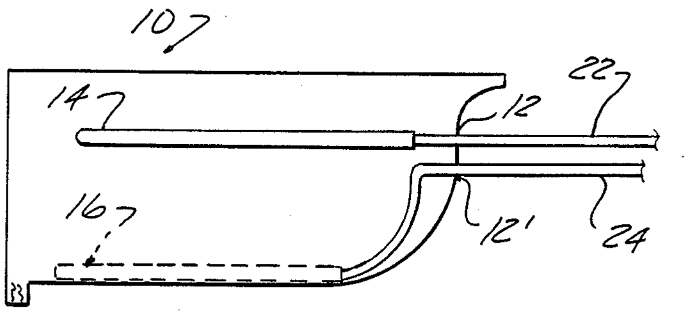
FIG. 1 is a cross-sectional view of an automotive oil pan modified to enable performance of the process of the present invention.
Figure 2:
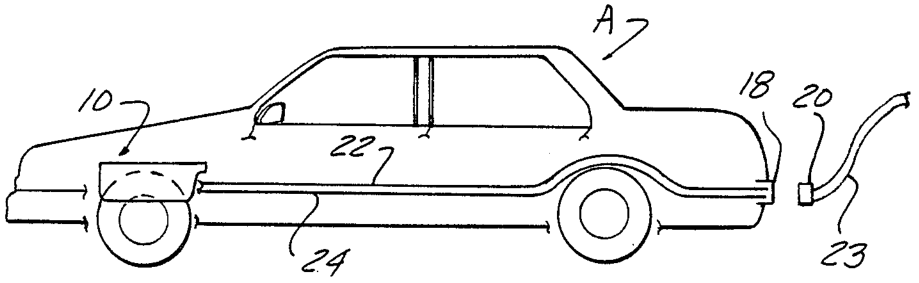
FIG. 2 is a schematic diagram of an automobile containing the modified oil pan of FIG. 1 showing the empty and fill spray lines extending to a remote location on the automobile.

As shown in FIG. 1, the through bores 12, 12' are centrally located on a flat surface of the oil pan 10. As shown in FIG. 1, the modified oil pan 10 includes a spray pattern 14 and a suction wand 16 extending through bores 12, 12' and connected to a coupling member 18 (shown in FIG. 2) remote from the oil pan 10. In the preferred=embodiment, the spray pattern 14 is located above the normal oil level for the cold engine to permit flushing fluid sprayed through the pattern 14 to wash down the walls bringing contaminants with it. Coupling member 18 is adapted to matingly receive coupling member 20 to which oil change conduit 23 containing appropriate empty and fill hoses is connected. The coupling member 18 and 20 are configured to facilitate quick connection and disconnection for ease convenience and expediency.

As shown in FIG. 1, a separate suction hose 22 and fill hose 24 extend from oil pan 10 to a remote location on the exterior of automobile A at which the suitable quick disconnect coupling device can be located.

Figure 3:
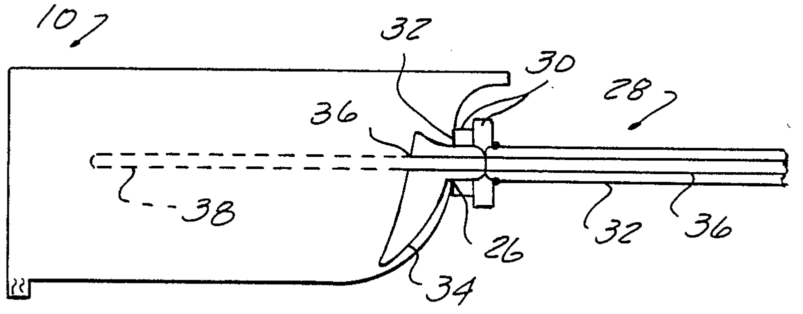
FIG. 3 is a cross-sectional view of an oil pan having an alternate embodiment of the present invention.

Another alternate oil pan modification is shown in FIG. 3 in which the oil pan 10 includes a single through bore 26 adapted to receive a single concentric double tube conduit 28 with suitable coupling means 30. The double tube conduit 28 includes an outer suction tube 32 which may, if desired terminate in a flared opening 34 for maximum drainage into the interior of an oil pan 10. A fill tube 36 is located concentrically on the interior of the suction tube 36 and terminates in a spray surface 38. The double tube conduit 28 is adapted to be removably inserted into the oil pan 10 as needed. The fill tube 36 is, preferably located located above the oil level as previously described.

In the process of the present invention, an external oil change conduit 23 is attached to an appropriately prepared vehicle. The conduit is composed of at least one fill hose and one suction hose. The suction hose is connected with a suitable suction source and terminates at a suitable waste oil collection source. The fill hose is connected to a fresh oil reservoir and a flushing fluid supply source and is equipped with a suitable diverter valve (not shown) and an appropriate pump connections (not shown) to permit conveyance of the desired material.

Once attached, flushing fluid is sprayed under pressure to contact the affected engine parts and the oil pan interior to remove the oil and particulates which adhere thereto by a sheeting action. Subsequent to or simultaneously with the flushing fluid spray, the spent oil is removed from the oil pan through the suction hose and conveyed to the suitable waste oil storage container (not shown). The initial flushing fluid spray is particularly advantageous where the spend oil has become particularly viscous. In such instances, the portion of the flushing fluid introduced into the spent oil prior to pump-out also improves the flow characteristics of the dirty oil.

The flushing fluid introduced can be any material or composition which is miscible with motor oil and exhibits suitable detergency and cleaning characteristics but is inert to the oil pan and associated engine components. It is also preferable that the flushing fluid provides sufficient lubricity or sheeting action to enhance the sheeting action of the flushing fluid dislodging particulate contaminants and carrying them with the flushing fluid as it trickles under gravity back to the oil pan. The flushing fluid employed is, preferably, one which is compatible with waste oil and is not detrimental in any subsequent waste oil recycling processes and one which does not deposit undesirable constituents which adhere to oil pan surfaces and engine components.

In the preferred embodiment, the flushing fluid employed in the present invention consists essentially of a solvent miscible with oil, a compatible detergent capable of improving the detergency of the flushing fluid and a lubricating additive capable of enhancing the sheeting action of the flushing fluid.

The solvent employed in the preferred embodiment is an organic fluid selected from the group consisting of high flash point kerosene and mixtures thereof. The flash point of the kerosene is preferably above about 150° F. It is to be understood that other solvents having similar characteristics to high flash point kerosene may be employed in admixture or substituted in the flushing fluid.

The detergent employed in the present invention is an organic fluid selected form the group consisting of butyl cellosolve. The butyl cellosolve is employed in sufficient concentration to provide detergency in the flushing fluid.

The lubricating additive employed in the flushing fluid is, preferably, a methyl ester having a carbon chain between twelve and twenty carbon atoms or mixtures of such methyl esters in an amount sufficient to provide lubricity and sheeting action to the flushing fluid.

When introduced into the spent oil in the oil pan prior to pump-out, the flushing fluid of the present invention can be introduced in a ratio of solvent to spent oil which facilitates oil removal and improves oil flow characteristics. The amount of flushing fluid introduced and the duration of the spray will vary depending upon the condition of the spent oil and the nature and level of contaminants and the tenacity with which the contaminants adhere to the crank case.

The flushing fluid is, preferably, introduced under pressure in a spraying action to contact and wash engine parts, for example the crank-shaft, connecting rods, pistons and associated hardware as well as the walls and surfaces of the oil pan interior to bring dirty oil and entrained particulates down with it. The pressure employed to spray the flushing fluid is sufficient to permit the flushing fluid to contact the various engine parts.

Simultaneous with or immediately after the removal of the waste oil and introduced flushing fluid from the oil pan, additional amounts of flushing fluid are sprayed into the oil pan and engine parts to dislodge the sticky residues on engine components or the oil pan to remove any residual dirty oil which may remain on the interior surfaces of the oil pan once the waste oil has been emptied. The flushing fluid is then removed through the suction hose into the appropriate waste collection reservoir. The removal of the flushing fluid introduced in this spraying step may be simultaneous with the spraying step. Alternately, the flushing fluid may be held in the oil pan for suitable intervals to enhance cleaning.

If necessary, a final spray of flushing fluid can be introduced with simultaneous suction through the suction hose to remove any waste oil still retained in the oil pan. In the preferred embodiment, the final spray step continues until the sticky residue is removed.

Once the final spray step is completed, an amount of oil appropriate to the model of vehicle is sprayed into the oil pan through the fill hose under sufficient pressure to contact the newly cleaned crank case and relubricate it. The spraying action permits the oil to relubricate the crank case componants. After the addition of the clean oil is complete, the oil change conduit is removed and the coupling member is sealed appropriately.

It is to be understood that the process of this invention can be automated to further simplify the procedure.

The present invention provides a simplified high speed process in which greater amounts of spent oil can be removed with each oil change in a manner which reduces the time necessary to accomplish the oil change, the mess associated therewith provides a cleaner crank case environment for the fresh motor oil, improves motor filter life and improves engine performance.

Having described the process of the present invention, what is claimed is:

1. A process for changing oil in an internal combustion engine having a crankcase, the crank case comprising movable componants and an pan with interior surfaces, the oil pan equipped with a through bore and an associated coupling member, the process comprising the steps of:

attaching an oil change conduit to the coupling member, said oil change conduit having at least one suction hose and at least one fill hose, said suction hose extending into the interior of the oil pan and said fill hose having a fill-spray assembly extending into the interior of the oil pan;

spraying a flushing fluid through said fill hose and said fill-spray assembly into the crank case interior under sufficient pressure to permit contact between said flushing fluid and movable engine parts and the interior surfaces of the oil pan;

removing spent oil and said introduced flushing fluid present in the oil pan from the pan through said suction hose;

spraying additional flushing fluid into the crank case through said fill spray assembly;

removing said additional flushing fluid introduced into the oil pan through said suction hose;

spraying an amount of fresh motor oil appropriate for the vehicle into the crank case through said fill-spray assembly after removal of said flushing fluid, said fresh motor oil being sprayed at a pressure sufficient to permit contact between the fresh motor oil and said movable engine parts and said interior surfaces of the oil pan; and removing said oil change conduit from the coupling member.

2. The process of claim 1 wherein said flushing fluid consists essentially of:

an organic fluid selected from the group consisting of kerosene having a flash point above about 150° F;

an additive selected from the group consisting of butyl cellosolve present in an amount sufficient to enhance detergency action of said flushing fluid; and a lubricant additive selected form the group consisting of methyl esters with carbon chains having between about twelve and about twenty carbon atoms, said lubricant additive being present in an amount sufficient to enhance sheeting action of said flushing fluid.

3. The process of claim 1 wherein said flushing fluid is sprayed into the crank case and allowed to contact said spent oil prior to removal from the oil pan to reduce the viscosity of said spent oil to a level sufficient to permit high speed removal through said suction hose.

4. The process of claim 1 wherein said flushing fluid is sprayed into the crank case after removal of said spent oil for an interval sufficient to dislodge particulates and degraded oil additives in said spent oil remaining in the crank case.

5. The process of claim 4 further comprising the step of spraying the crank case with an additional amount of said flushing fluid with simultaneous removal through said suction hose immediately prior to introduction of said fresh motor oil.

6. The process of claim 1 wherein said additional flushing fluid sprayed into the crankcase is permitted to trickle into the oil pan and be removed through said suction hose, this removal occuring simultaneously with said spraying of additional flushing fluid.

7. A process for changing oil in an internal combustion engine having a crank case, the crank case comprising movable componants and an oil pan with interior surfaces, the oil pan equipped with a through bore and an associated coupling member, the process comprising the steps of:

attaching an oil change conduit to the coupling member, said oil change conduit having at least one suction hose and at least one fill hose, said suction hose extending into the interior of the oil pan and said fill hose having a fill-spray assembly extending into the interior of the oil pan;

spraying a flushing fluid through said fill hose and said fill-spray assembly into the crank case interior under sufficient pressure to permit contact between said flushing fluid and movable engine parts and the interior surfaces of the oil pan;

simultaneously removing spent oil and said introduced flushing fluid present in the oil pan from the pan through said suction hose;

spraying additional flushing fluid into the crank case through said fill spray assembly for an interval sufficient to remove said spent oil remaining in the oil pan after the majority of spent oil has been previously removed;

removing said additional flushing fluid introduced into the oil pan through said suction hose said removal process occurring simultaneous with said spraying of additional flushing fluid;

spraying an amount of fresh motor oil appropriate for the vehicle into the crank case through said fill-spray assembly after removal of said flushing fluid, said fresh motor oil being sprayed at a pressure sufficient to permit contact between the new motor oil and said movable engine parts and said interior surfaces of the oil pan; and removing said oil change conduit from the coupling member.

8. A process for changing oil in an internal combustion engine having a crank case, the crank case comprising movable componants and an oil pan with interior surfaces, the oil pan equipped with a through bore and an associated coupling member, the process comprising the steps of:

attaching an oil change conduit to the coupling member, said oil change conduit having at least one suction hose and at least one fill hose, said suction hose extending into the interior of the oil pan and said fill hose having a fill-spray assembly extending into the interior of the oil pan;

removing spent oil from the crank case through said suction hose;

spraying flushing fluid into the crank case through said fill spray assembly for an interval sufficient to remove said spent oil remaining in the crank case;

removing said additional flushing fluid introduced into the crank case through said suction hose;

spraying an amount of fresh motor oil appropriate for the vehicle into the crank case through said fill-spray assembly after removal of said flushing fluid, said fresh motor oil being sprayed at a pressure sufficient to permit contact between the fresh motor oil and said movable engine parts and said interior surfaces of the oil pan; and removing said oil change conduit from the coupling member.

* * * * *